US012638413B2

(12) United States Patent
Rappleye

(10) Patent No.: US 12,638,413 B2
(45) Date of Patent: May 26, 2026

(54) SATURATED AND BUFFERED REFERENCE ELECTRODE FOR MOLTEN SALT ELECTROCHEMICAL MEASUREMENTS

(71) Applicant: BRIGHAM YOUNG UNIVERSITY, Provo, UT (US)

(72) Inventor: Devin Rappleye, Lindon, UT (US)

(73) Assignee: Brigham Young University, Provo, UT (US)

( * ) Notice: Subject to any disclaimer, the term of this patent is extended or adjusted under 35 U.S.C. 154(b) by 110 days.

(21) Appl. No.: 18/433,960

(22) Filed: Feb. 6, 2024

(65) Prior Publication Data

US 2024/0264107 A1 Aug. 8, 2024

Related U.S. Application Data

(60) Provisional application No. 63/443,596, filed on Feb. 6, 2023.

(51) Int. Cl.
G01N 27/30 (2006.01)

(52) U.S. Cl.
CPC .................................. G01N 27/301 (2013.01)

(58) Field of Classification Search
CPC ...... G01N 27/31; G01N 33/05; G01N 27/301; G01N 33/205
See application file for complete search history.

(56) References Cited

U.S. PATENT DOCUMENTS

| | | | | |
|---|---|---|---|---|
| 3,806,439 A | * | 4/1974 | Light et al. .......... | G01N 27/301 |
| | | | | 204/435 |
| 5,334,305 A | * | 8/1994 | Okada .................. | G01N 27/301 |
| | | | | 204/435 |
| 2011/0108439 A1 | * | 5/2011 | Gourishankar .... | G01N 27/4166 |
| | | | | 205/789 |
| 2021/0055248 A1 | | 2/2021 | Tripathy | |

FOREIGN PATENT DOCUMENTS

| | | | | | |
|---|---|---|---|---|---|
| JP | 2017-3378 A | * | 1/2017 | ........... | G01N 27/401 |
| KR | 10-1729624 B1 | * | 5/2017 | ............. | G01R 31/36 |
| TW | 201727675 A | | 8/2017 | | |

(Continued)

OTHER PUBLICATIONS

EPO machine-generated English language translation of JP 2017-3378 A, patent published Jan. 5, 2017 (Year: 217).*

(Continued)

*Primary Examiner* — Alexander S Noguerola

(74) *Attorney, Agent, or Firm* — David Cook; Loyal IP Law, PLLC

(57) ABSTRACT

Disclosed is a reference electrode that includes a tube, saturated reference salt, an excess reference salt, and a wire. The saturated reference salt and the excess reference salt are placed inside the tube. The wire is also placed inside the tube. Also disclosed is a system comprising a crucible, a working electrode, a counter electrode, and a reference electrode. The crucible contains molten salt. The electrodes are placed within the molten salt. The reference electrode of the system includes a tube, saturated reference salt, an (Continued)

200

205 — Dry saturated reference salt and tube

210 — Place dry saturated reference salt into the dry tube

215 — Dry excess reference salt

220 — Mix dry excess reference salt and dry saturated reference salt

225 — Insert wire

230 — Secure stopper

235 — Heat mixture excess reference salt, and a wire. The saturated reference salt and the excess reference salt are placed inside the tube. The wire is also placed inside the tube.

17 Claims, 7 Drawing Sheets

(56)                    References Cited

FOREIGN PATENT DOCUMENTS

| | | | |
|---|---|---|---|
| TW | 201812273 | A | 2/2019 |
| TW | 202222703 | A | 6/2022 |

OTHER PUBLICATIONS

EPO machine-generated English language translation KR 10-1739624 of A, patent published May 24, 2017 (Year: 2017).*

Shinwari et al., "Microfabricated Reference Electrodes and their Biosensing Applications," Sensors 2010, 10, 1679-1715; doi: 10.3390/s100301679 (Year: 2010).*

Ellis et al., "Sodium and sodium-ion energy storage batteries," Current Opinion in Solid State and Materials Science, vol. 16, Issue 4, Aug. 2012, pp. 168-177 (Year: 2012).*

\* cited by examiner

100

110

115

105

120

125

200

205 — Dry saturated reference salt and tube

210 — Place dry saturated reference salt into the dry tube

215 — Dry excess reference salt

220 — Mix dry excess reference salt and dry saturated reference salt

225 — Insert wire

230 — Secure stopper

235 — Heat mixture

400

405 Ready SRE

410 Position SRE, CE, and WE above crucible

415 Heat/Melt salt in crucible

420 Insert SRE, CE, and WE into molten salt

425 Connect electrodes

430 Run experiment(s)

600

605    Ready SRE

610    Position SRE, CE, and WE above crucible

615    Heat/Melt salt in crucible

620    Insert RE, SRE, CE and WE into molten salt

625    Connect electrodes

630    Run experiment(s)

1

SATURATED AND BUFFERED REFERENCE ELECTRODE FOR MOLTEN SALT ELECTROCHEMICAL MEASUREMENTS

PRIORITY CLAIM

This application claims the benefit of and priority to U.S. Provisional Patent Application 63/443,596 filed on Feb. 6, 2023.

BACKGROUND

The roots of electrochemistry can be traced back to the late 18th century when Luigi Galvani and Alessandro Volta independently made groundbreaking discoveries. Galvani's experiments with frog muscles demonstrated the existence of "animal electricity," while Volta's invention of the voltaic pile laid the foundation for the first chemical battery. These early revelations sparked a new era of scientific exploration, highlighting the intrinsic connection between electricity and chemical processes.

In the 19th century, Michael Faraday emerged as a central figure in the development of electrochemistry. His profound contributions include Faraday's laws of electrolysis, which quantitatively relate the amount of substance undergoing electrochemical reactions to the electric current passing through a solution. Faraday's insights provided a crucial link between the macroscopic world of chemistry and the microscopic realm of atomic and molecular interactions.

The invention of the Daniell cell by John Frederic Daniell in 1836 marked a significant milestone. Daniell's cell, based on the redox reaction between copper and zinc, demonstrated the practical application of electrochemistry and laid the groundwork for the development of batteries. Additionally, the work of Gibbs and Helmholtz in the late 19th century introduced thermodynamic principles to electrochemistry, providing a theoretical framework for understanding the spontaneity and feasibility of electrochemical processes.

In the early 20th century, the German chemist Walther Nernst formulated the Nernst equation, which relates the concentrations of reactants and products to the cell potential. This equation became fundamental in understanding and predicting the behavior of electrochemical cells under various conditions. Furthermore, the field of electrochemical kinetics blossomed with the work of researchers like Butler and Volmer, shedding light on the rates of electrode reactions and the factors influencing reaction mechanisms.

The latter half of the 20th century witnessed a surge in electrochemical research, fueled by advancements in materials science, nanotechnology, and renewable energy. Innovations such as solid-state batteries, fuel cells, and electrochemical sensors have emerged, revolutionizing energy storage, transportation, and analytical chemistry. The development of electrochemical methods for environmental remediation and the synthesis of advanced materials further showcase the breadth and depth of electrochemical applications in the modern era.

Electrodes, in the modern era, became essential components in furthering electrochemical advancements. Electrodes are used for various applications, including environmental monitoring, medical diagnostics, and industrial process control. A reference electrode is a type of electrode used in electrochemical measurements and experiments to establish a stable and known electric potential against which other electrodes can be compared. It serves as a reference point in electrochemical cells, allowing for accurate measurements of the potential difference between the reference electrode and the working electrode.

Molten salts illustrate new electrochemical advancement opportunities in the modern era. Molten salts provide a variety of advantageous properties such as high thermal stability, heat-transfer properties, wide liquid temperature range, high solubility, corrosion resistance, electrolytic conductivity, versatile composition, non-volatile in nature, chemical inertness, and thermal storage.

Michael Faraday and later Waldemar Jungner first used molten salts in their experiments in the 17th Century. However, the turning point in the exploration of molten salts occurred in the 20th Century, Scientists embarked on systematic studies, unraveling the physical and chemical properties of these compounds. This period witnessed the emergence of high-temperature electrochemistry building upon the research of Michael Faraday and Waldemar Jungner to open the way for future industrial applications.

Molten salts played a significant role in aluminum extraction using Cryolite, a molten salt, in the process. Later in molten salt reactors, molten fluoride salts were used as both a fuel and a coolant in nuclear reactors. In the latter part of the 20th century, molten salt began to be used as a heat transfer fluid and thermal energy storage medium for concentrated solar power plants. Molten salts are now being used in chemical synthesis, metal refining, batteries, heat treatment, electroplating, catalysis, desalination, and material science.

Though molten salts have many applications many more uses are not currently available because there are characteristics of molten salts that are not yet understood including thermodynamic properties. Thermodynamic potentials can help with the understanding of thermodynamic properties through electrochemical methods. To perform these electrochemical methods, it is helpful to have a stable repeatable reference electrode that can be useable in the corrosive environment of molten salts.

Several different types of reference electrodes have been attempted with molten salts with little success. A quasi-reference electrode often uses platinum or tungsten in contact with the molten salt. However, the quasi-reference electrode tended to be unreliable because its potential is influenced by the bulk salt composition, including dilute contaminants. Because of the dependency on dilute contaminants, the quasi-reference electrode was difficult to replicate. The standard chlorine electrode ("SCE") is not often used with molten salts because some of the extreme temperatures of some molten salts exceed the operable range of the SCE. The extreme temperatures of molten salts may lead to electrode thermal instability, electrode malfunction, or electrode damage, affecting the accuracy and reliability of chloride ion measurements. Also, molten salts can be corrosive and may react with electrode components, leading to contamination, deterioration, or changes in electrode properties. Furthermore, chlorine gas, as a matter of practice, can be difficult to handle. Silver/silver chloride reference electrode has also been used while testing molten salts. However, the lack of standardized construction and concentrations of silver chloride in the silver/silver reference electrode has made it difficult to produce consistent correlations. Moreover, there is a lack of supporting data to support reports of the stability of the silver/silver chloride reference electrode.

It is the object of this disclosure to present a system and a method of a stable and practical saturated reference electrode that can be used in molten salt systems.

3

SUMMARY OF THE DISCLOSURE

Disclosed herein is a reference electrode that includes a tube, saturated reference salt, an excess reference salt, and a wire. The saturated reference salt and the excess reference salt are placed inside the tube. The wire is also placed inside the tube. Also disclosed is a system comprising a crucible, a working electrode, a counter electrode, and a reference electrode. The crucible contains molten salt. The electrodes are placed within the molten salt. The reference electrode includes a tube, saturated reference salt, excess reference salt, and a wire. The saturated reference salt and the excess reference salt are placed inside the tube. The wire is also placed inside the tube.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. The advantages of the disclosure will become better understood with regard to the following description and accompanying drawings where.

DETAILED DESCRIPTION

In the following description of the disclosure, reference is made to the accompanying drawings, which form a part hereof, and in which are shown by way of illustration-specific implementations in which the disclosure may be practiced. It is understood that other implementations may be utilized, and structural changes may be made without departing from the scope of the disclosure.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure may be alternatively included in another embodiment or figure regardless of whether or not those elements are shown or described in another embodiment or figure. In other words, elements in the figures may be interchangeable between various embodiments disclosed herein, whether shown or not.

Figure 1:
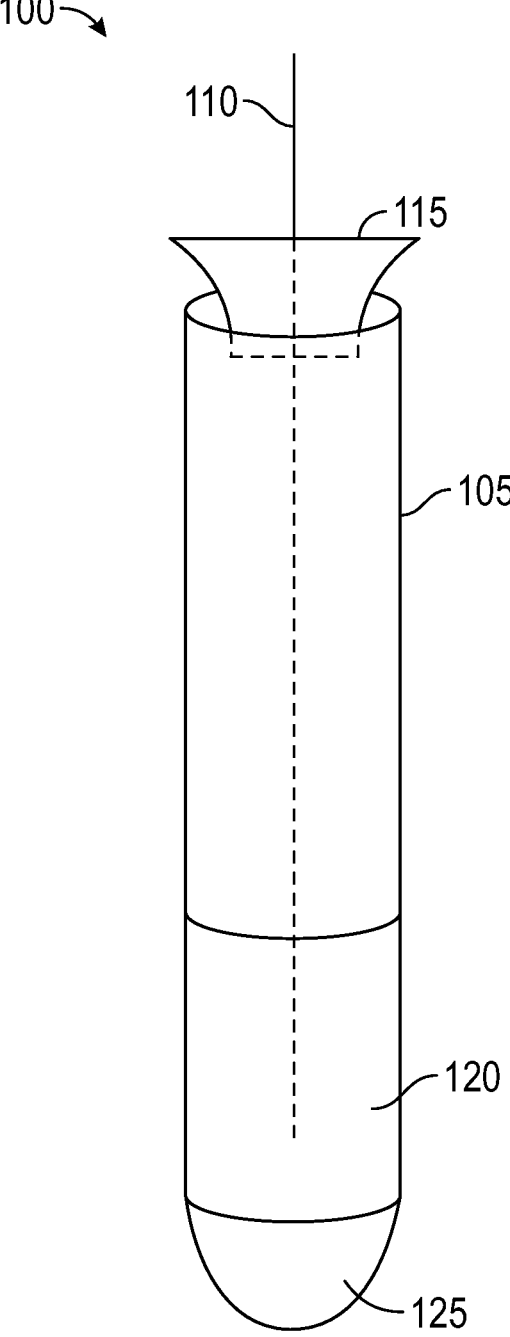
FIG. 1 illustrates a saturated reference electrode.

FIG. 1 illustrates saturated reference electrode 100 that may include a one-end closed ceramic or glass tube 105. Tube 105 may contain alumina which is an oxide of aluminum. Saturated reference salt 120 may be placed within tube 105. Wire 110 is placed into tube 105 such that the wire 110 has a length that allows the wire to be placed within saturated reference salt 120. Wire 110 may pierce through stopper 115 allowing wire 110 to extend upward beyond stopper 115. Wire 110 may be comprised of silver nickel or other metals known in the art. Stopper 115 is used to create a seal on the top portion of tube 105. Stopper 115 may be made of rubber or other material known in the art. Excess reference salt 125 may also be placed in tube 105. Excess reference salt 125 may be placed in contact with saturated reference salt 120 to help saturated reference salt 120 maintain saturation. For example, saturated reference salt 120 may be a combination of silver chloride ("AgCl") mixed or combined with calcium chloride ("CaCl$_2$"), lithium chloride ("LiCl"), and/or sodium chloride (NaCl). Moreover, other salt mixtures may be used or included such as eutectic salt mixtures may be used such as lithium chloride—potassium chloride ("LiCl—KCl") and/or sodium chloride—potassium chloride ("NaCl—KCl") and other salt mixtures known in the art. Excess reference salt 125 may include anhydrous nickel(II) chloride ("NiCl$_2$") or other salts known in the art that may saturate then form a separate phase (i.e., solid) to hold the excess salt and buffer or maintain saturation. For example, salts like cobalt(II) chloride ("CoCl$_2$"), iron(II) chloride ("FeCl$_2$"), manganese(II) chloride ("MnCl$_2$"), and other salts may work in various applications.

Figure 2:
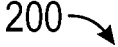
FIG. 2 illustrates a method of preparing a saturated reference electrode.
Figure 2:
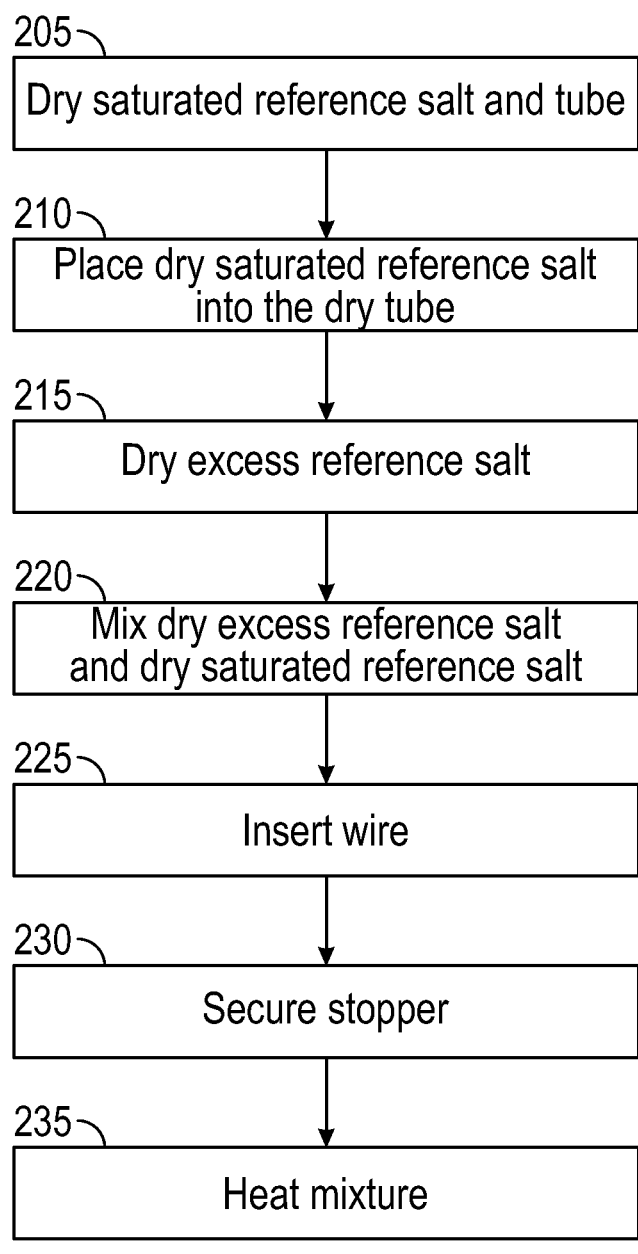

FIG. 2 illustrates method 200 of preparing a saturated reference electrode 100. First step 205 may include drying both saturated reference salt 120 and tube 105. Tube 105 may be comprised of ceramic or glass that may include alumina. Saturated reference salt 120 may include but is not limited to calcium chloride ("CaCl$_2$"), lithium chloride ("LiCl"), sodium chloride (NaCl), and or eutectic mixtures such as lithium chloride-potassium chloride ("LiCl—KCl") and/or sodium chloride-potassium chloride ("NaCl—KCl") and other salt mixtures known in the art. Second step 210 may include placing dry saturated reference salt 120 into dry tube 105. In third step 215, excess reference salt may be dried. For example, excess reference salt 125 may include nickel(II) chloride hexahydrate ("NiCl$_2$ 6H$_2$O") that is dried perhaps in a vacuumed furnace to obtain anhydrous nickel (II) chloride ("NiCl$_2$"). Excess reference salt 125 may include anhydrous nickel(II) chloride ("NiCl$_2$") or other salts known in the art that may saturate then form a separate phase (i.e., solid) to hold the excess salt and buffer or maintain saturation. For example, salts like cobalt(II) chloride ("CoCl$_2$"), iron(II) chloride ("FeCl$_2$"), manganese(II) chloride ("MnCl$_2$"), and other salts may work in various applications. In fourth step 220, saturated reference salt 120 may be mixed or combined with excess reference salt 125 in tube 105. Enough salt may be added into tube 105 at one time to obtain saturated reference salt 120 and excess reference salt 125. In other words, there is enough reference salt with a base salt to create a saturated reference salt 120 with excess reference salt 125 present.

In fifth step 225, wire 110 may be inserted into tube 105. Wire 115 may be comprised of nickel, silver, or other metals known in the art. The composition of wire 115 used may depend on the type of saturated reference salt used. In sixth step 230 wire 110 may pierce through or otherwise traverse stopper 115. In sixth step 235, may include heating tube 105 above the melting point of saturated reference salt 120 used in saturated reference electrode 100. Once heated saturated reference electrode may be used in an electrochemical cell.

Figure 3:
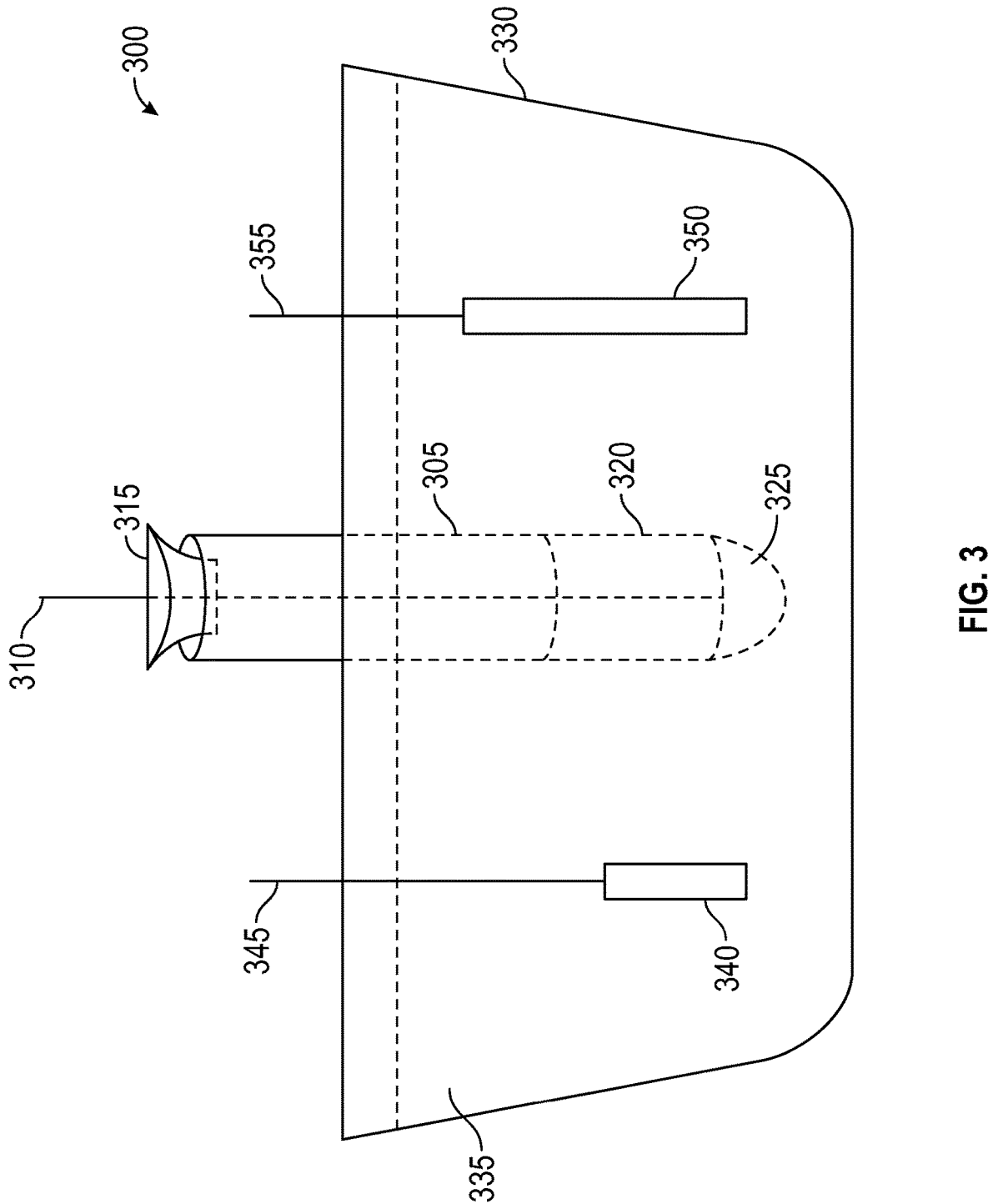
FIG. 3 illustrates a molten salt electrochemical cell with a saturated reference electrode.

FIG. 3 illustrates molten salt electrochemical cell 300 with saturated reference electrode 100. Saturated reference electrode 100 may include a one-end closed ceramic or glass tube 305. Tube 305 may contain alumina which is an oxide of aluminum. Saturated reference salt 320 may be placed within tube 105. Wire 310 is placed into tube 305 such that the wire 310 has a length that allows the wire to be placed within saturated reference salt 320. Wire 310 may pierce through stopper 315. Wire 310 may be comprised of silver nickel or other metals known in the art. Stopper 315 is used to create a seal on the top portion of tube 305. Excess reference salt 325 may also be placed in tube 305. Excess reference salt 325 may be placed in contact with saturated reference salt 320 to help saturated reference salt 320 maintain saturation. For example, saturated reference salt 320 may be a combination of silver chloride ("AgCl") mixed or combined with calcium chloride ("CaCl₂"), lithium chloride ("LiCl"), and/or lithium chloride-potassium chloride ("LiCl—KCl") and/or sodium chloride-potassium chloride ("NaCl—KCl") and other salt mixtures known in the art. Excess reference salt 325 may include anhydrous nickel(II) chloride ("NiCl₂") or other salts known in the art that can satisfy the same role. Saturated reference electrode 100 may be placed within crucible 330 that contains molten salt 335. Also, within crucible 300 of molten salt 335 is working electrode ("WE") 340 with wire 345 extending off the base of the electrode 340. Also included in electrochemical cell 300 is a counter electrode ("CE") 350 that has wire 355 extending off of the base of the counter electrode 350. Wires in saturated reference electrode 305, working electrode 340, and counter electrode ("CE") 350. Working electrode ("WE") 340 and counter electrode ("CE") may be composed of tungsten or other metals known in the art.

Figure 4:
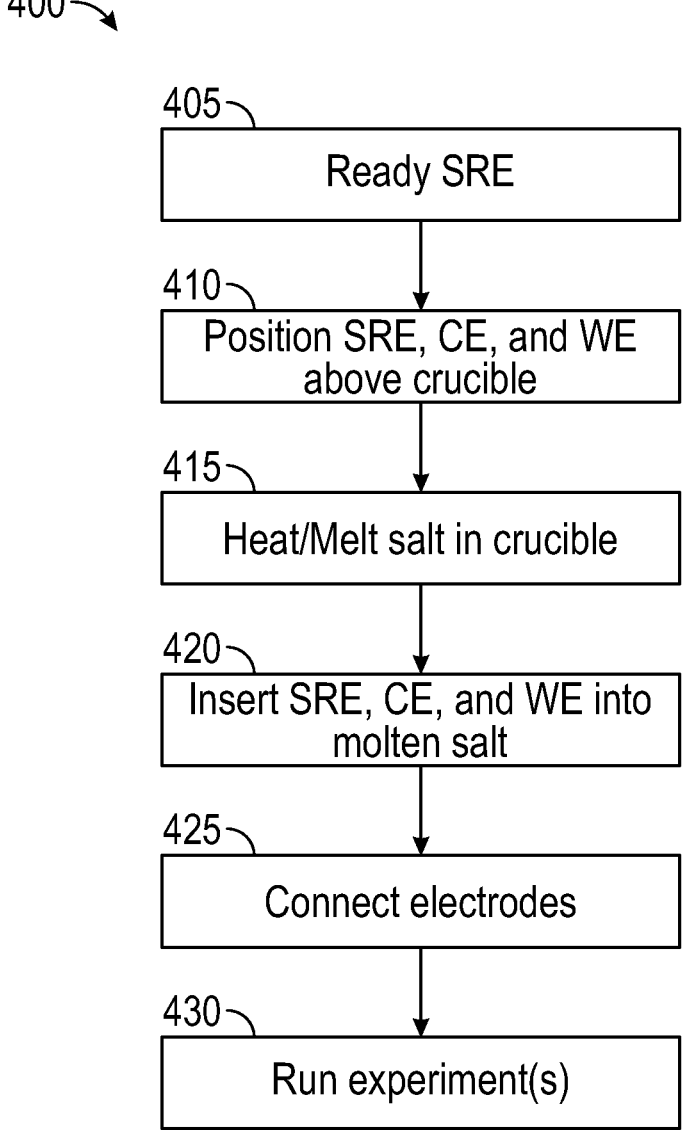
FIG. 4 illustrates a method of preparing a molten salt electrochemical cell with a saturated reference electrode.

FIG. 4 illustrates method 400 for preparing a molten salt electrochemical cell with saturated reference electrode 100. First step 405 may include readying saturated reference electrode ("SRE") 100. To ready saturated reference electrode ("SRE") 100 may include similar steps as found in method 200. Accordingly, method 400 may include step 205 which may include drying both saturated reference salt 320 and tube 305. Tube 305 may be comprised of ceramic or glass that may include alumina. Saturated reference salt 320 may include but is not limited to calcium chloride ("CaCl₂"), lithium chloride ("LiCl"), lithium chloride—potassium chloride ("LiCl—KCl"), and/or sodium chloride—potassium chloride ("NaCl—KCl") and/or other salt mixtures known in the art. Second step 210 may include placing dry saturated reference salt 320 into dry tube 305. In third step 215, excess reference salt may be dried. For example, excess reference salt 325 may include nickel(II) chloride hexahydrate ("NiCl₂ 6H₂O") that is dried in perhaps a vacuumed furnace to obtain anhydrous nickel(II) chloride ("NiCl₂"). Excess reference salt 325 may include anhydrous nickel(II) chloride ("NiCl₂") or other salts known in the art that may saturate then form a separate phase (i.e., solid) to hold the excess salt and buffer or maintain saturation. For example, salts like cobalt(II) chloride ("CoCl₂"), iron(II) chloride ("FeCl₂"), manganese(II) chloride ("MnCl₂"), and other salts may work in various applications. In fourth step 220, saturated reference salt 320 may be mixed or combined with excess reference salt 325 in tube 305. Enough salt may be added into tube 305 at one time to obtain saturated reference salt 320 and excess reference salt 325. In other words, there is enough reference salt with a base salt to create a saturated reference salt 320 excess reference salt 325 present. In fifth step 225, wire 310 may be inserted into tube 305. Wire 310 may be comprised of nickel, silver, or other metals known in the art. The composition of wire 310 used may depend on the type of saturated reference salt used. In sixth step 230 wire 310 may pierce through or otherwise traverse stopper 315. Sixth step 235 may include heating tube 305 above the melting point of saturated reference salt 320 used in saturated reference electrode 100.

In second step 410 saturated reference electrode ("SRE") 100 is prepared, saturated reference electrode ("SRE") 100, working electrode ("WE") 340, and counter electrode ("CE") 350 may be positioned above crucible 330 to be in a position to quickly placed within molten salt 335 when heated to the appropriate temperature. The appropriate temperature is at least to the temperature to change the salt from a solid to a liquid. In third step 415 salt is heated in crucible 330 to the appropriate temperature. In fourth step 420, saturated reference electrode ("SRE") 100, working electrode ("WE") 340, and counter electrode ("CE") 350 are inserted in the molten salt 335. In fifth step 425 electrodes 100, 340, and 350 are connected to whatever instrument(s) is needed to run the intended experiments. In sixth step 430, one or more experiments are run. These experiments may be used to determine the properties of molten salt 335.

Figure 5:
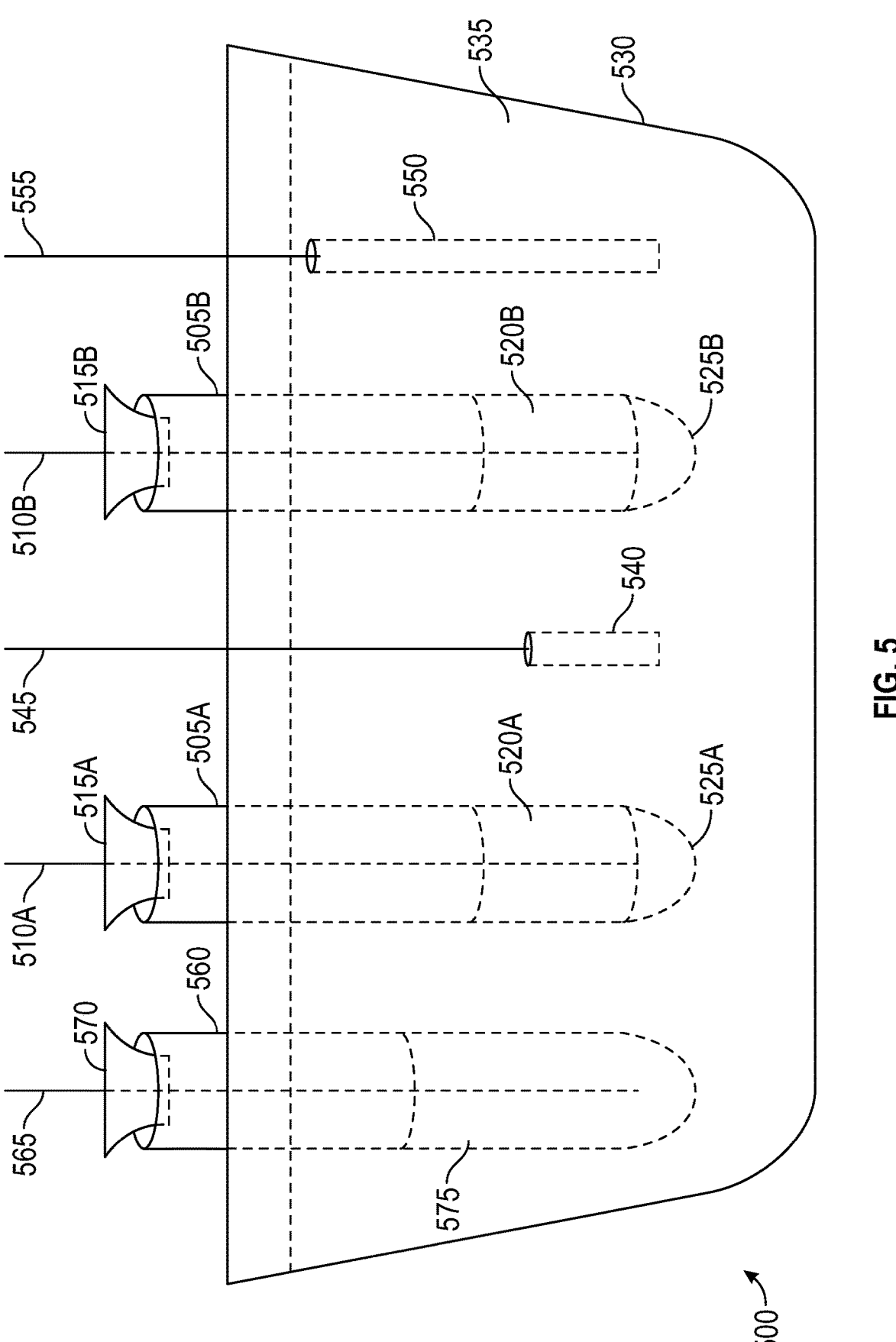
FIG. 5 illustrates a molten salt electrochemical cell using reference electrodes.

FIG. 5 illustrates molten salt 535 electrochemical cell 500 using saturated reference electrodes 505A-B and non-saturated reference electrode 560. The molten salt 535 of electrochemical cell 500 is placed in crucible 530. Electrodes 545, 555, 505A-B, and 560 may then be placed in molten salt 535. Non-saturated reference electrode 560 may be Ag|Ag⁺ reference electrode, for example. Working Electrode ("WE") 540 and counter electrode ("CE") 550 may be composed of tungsten or other metals known in the art. Saturated reference electrodes ("SRE") 505A-B and 560 may allow an observer to collect data on the accuracy of the reference electrodes. Electrodes 505A-B may include a one-end closed ceramic or glass tube 505A-B. Tube 505A-B may contain alumina which is an oxide of aluminum. Saturated reference salt 520A-B may be placed within the tube 505A-B. The amount of saturated reference salt 520A may differ from the amount of saturated reference salt 520B salt. For example, saturated reference salt 520A may have 40 mol % of salt while saturated reference salt 520 may have 50 mol % of salt.

Wire 510A-B is placed into tube 505A-B such that the wire 510A-B has a length that allows the wire to be placed within saturated reference salt 520A-B respectively. Wire 510A-B may pierce or otherwise traverse through stopper 515A-B. Wire 510A-B may be comprised of silver nickel or other metals known in the art. Stopper 515A-B is used to create a seal on the top portion of tube 505A-B. Excess reference salt 525A-B may also be placed in tube 505A-B. Excess reference salt 525 may be placed in contact with saturated reference salt 520A-B to help saturated reference salt 520A-B maintain saturation. For example, saturated reference salt 520A-B may be a combination of calcium chloride ("CaCl₂"), lithium chloride ("LiCl"), lithium chloride—potassium chloride ("LiCl—KCl"), sodium chloride-potassium chloride ("NaCl—KCl") and/or other salt mixtures known in the art.

Figure 6:
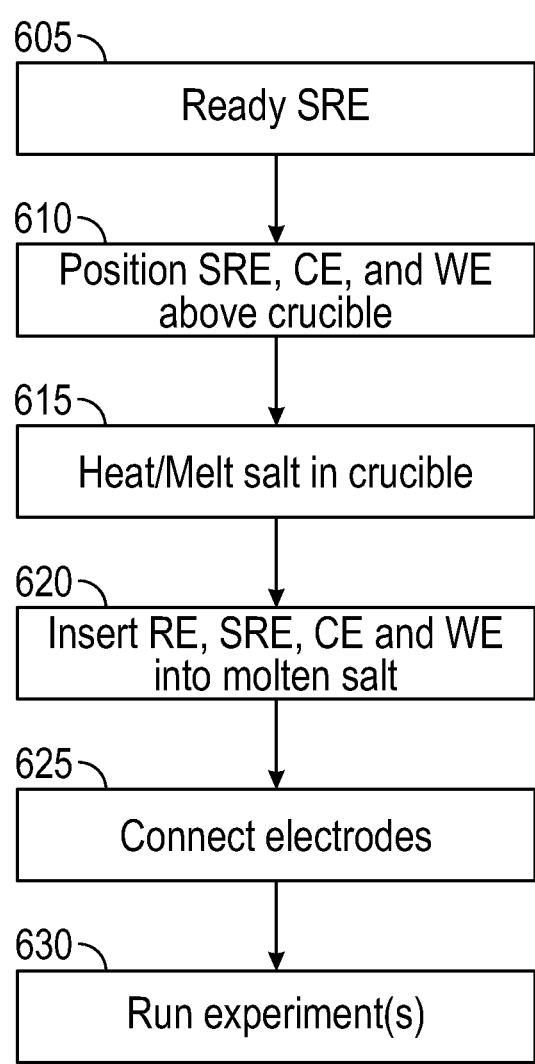
FIG. 6 illustrates a method for preparing a molten salt electrochemical cell for testing reference electrodes.

FIG. 6 illustrates method 600 for preparing a molten salt electrochemical cell for testing reference electrodes. First step 605 may include readying saturated reference electrodes ("SREs") 100. To ready saturated reference electrodes ("SREs") 100 may include similar steps as found in method 200. For example, first step 205 which may include drying both saturated reference salts 520A-B and tubes 505A-B. Tubes 505A-B may be comprised of ceramic or glass that may include alumina. Saturated reference salts 520A-B may include but are not limited to calcium chloride ("CaCl$_2$"), lithium chloride ("LiCl"), lithium chloride-potassium chloride ("LiCl—KCl") sodium chloride-potassium chloride ("NaCl—KCl"), and/or other salt mixtures known in the art. Second step 210 may include placing dry saturated reference salts 520A-B into dry tubes 505A-B. In third step 215, excess reference salt may be dried. For example, excess reference salts 525A-B may include nickel(II) chloride hexahydrate ("NiCl$_2$ 6H$_2$O") that is dried in perhaps a vacuumed furnace to obtain anhydrous nickel(II) chloride ("NiCl$_2$"). Excess reference salts 525A-B may include anhydrous nickel(II) chloride ("NiCl$_2$") or other salts known in the art that may saturate then form a separate phase (i.e., solid) to hold the excess salt and buffer or maintain saturation. For example, salts like cobalt(II) chloride ("CoCl$_2$"), iron(II) chloride ("FeCl$_2$"), manganese(II) chloride ("MnCl$_2$"), and other salts may work in various applications. In fourth step 220, saturated reference salts 520A-B may be mixed or combined with excess reference salts 525A-B in tubes 505A-B. Enough salt may be added into tubes 505A-B at one time to obtain saturated reference salts 520A-B and excess reference salt 525A-B. In other words, there is enough reference salt with a base salt to create saturated reference salts 520A-B with excess reference salts 525A-B present. In fifth step 225, wire 510A-B may be inserted into tube 105. Wires 510A-B may be comprised of nickel, silver, or other metals known in the art. The composition of wires 510A-B used may depend on the type of saturated reference salts 520A-B used. In sixth step 230 wires 510A-B may pierce through or otherwise traverse stopper 515A-B. In sixth step 235, may include heating tubes 505A-B above the melting point of saturated reference salts 520A-B used in saturated reference electrode 100. Further, the mol % of saturated salt 520A may differ from the mol % of saturated salt 520B.

In second step 610 one or more saturated reference electrodes ("SREs") 505A and/or 505B, non-saturated reference electrode ("RE") 575, working electrode ("WE") 540, and counter electrode ("CE") 550 to be in a position to be quickly placed within molten salt 535 when heated to the appropriate temperature. The appropriate temperature is at least to the temperature to change the salt from a solid to a liquid. Electrodes 505A-B, 575, 540, and 550, alternatively may be positioned elsewhere ready to be placed in crucible 530. In third step 615 salt may include heating salt in crucible 530 to the appropriate temperature to become molten salt 535. In fourth step 620, saturated reference electrode ("SREs") 505A-B, reference electrode ("RE") 575 working electrode ("WE") 540, and counter electrode ("CE") 550 are inserted in the molten salts. In fifth step 625 electrodes 505A-B, 575, 540, and 550 may be connected to whatever instrument(s) are needed to run the intended experiments. In sixth step 630, one or more experiments are run. These experiments may be used to determine the properties of molten salt 535.

Figures 7, 8, 9:
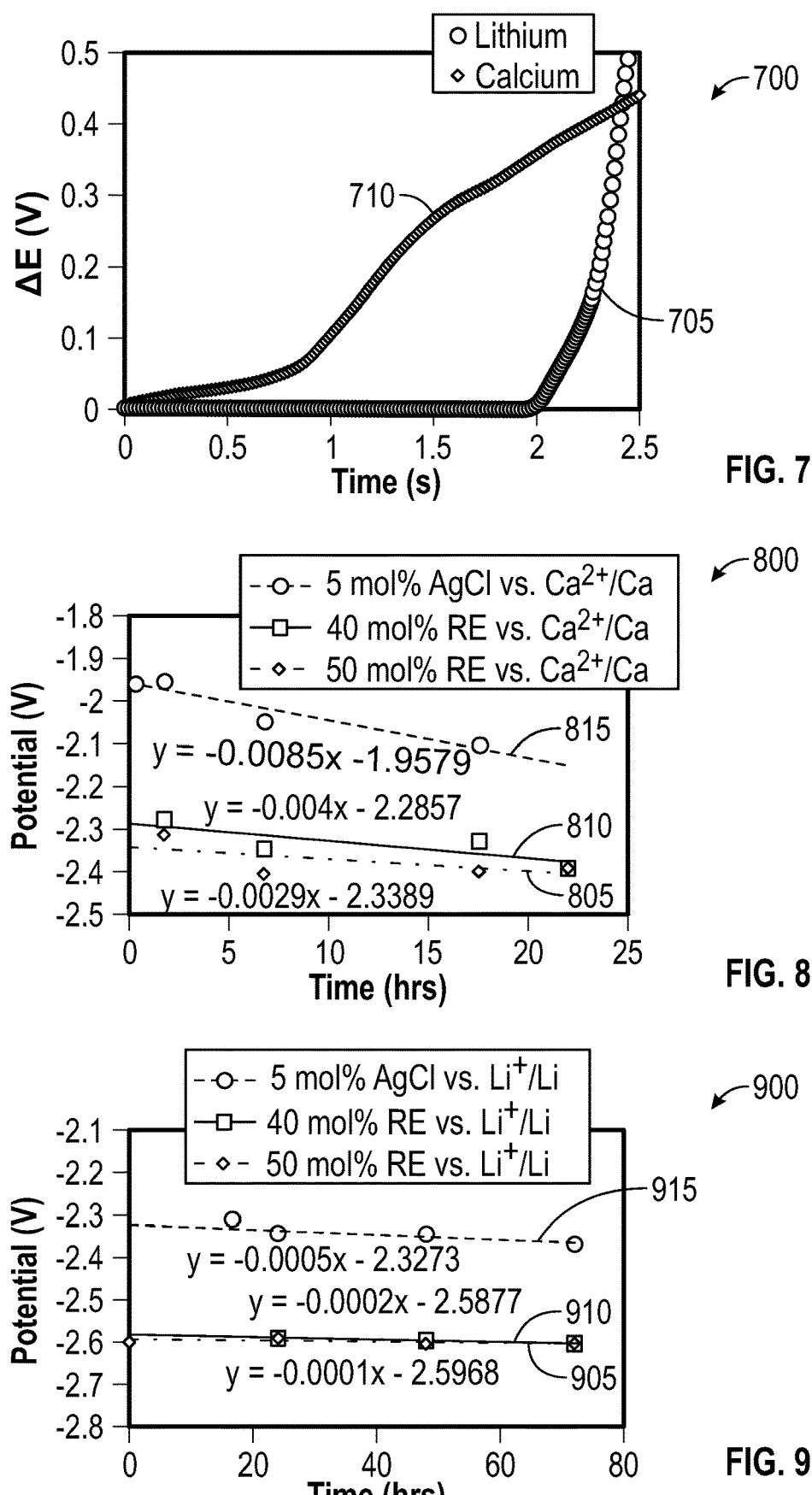
FIG. 7 illustrates a graphical representation of the change in oxidation potentials between lithium and calcium.
FIG. 8 illustrates a graphical representation of the results of preliminary stability test.
FIG. 9 illustrates a graphical representation of the results of preliminary stability test.

FIG. 7 illustrates graphical representation 700 of the change in oxidation potentials between lithium 705 and calcium 710. Graphical representation 700 represents a steady, equilibrium potential for Li$^+$/Li lithium in a molten lithium chloride ("LiCl") system and a less steady potential for Ca$^{2+}$/Ca in molten calcium chloride ("CaCl$_2$"). The potential drift of Ca$^{2+}$/Ca potential is attributed to the relatively high solubility of calcium metal in molten calcium chloride ("CaCl$_2$").

FIGS. 8 and 9 illustrate graphical representation 800 of the results of preliminary stability test. Each RE in calcium chloride shows more instability than in lithium chloride ("LiCl"). However, in calcium chloride ("CaCl") the saturated reference electrode ("SREs") still shows greater stability than an Ag|Ag$^+$ reference electrode ("RE") and good replicability to each other. In lithium chloride ("LiCl"), the Ni|Ni$^{2+}$ saturated reference electrodes ("SREs") exhibited drifts of −0.12 and −0.23 mV/day compared with a drift of −0.52 mV/day for the Ag$^+$|Ag RE. This may demonstrate that the Ni|Ni$^{2+}$ saturated reference electrodes ("SREs") are more stable than the Ag$^+$|Ag reference electrode ("RE").

While various embodiments of the present disclosure have been described above, it should be understood that they have been presented by way of example only, and not by limitation. For example, anywhere it is mentioned that a pneumatic system was used this could be substituted with a hydraulic, electric, or other type of motorized system that would be known in the art. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A reference electrode comprising:
   a tube;
   a saturated reference salt placed inside the tube;
   an excess reference salt in amounts beyond the saturation point is placed inside the tube comprising:
      nickel II chloride; and
   a wire placed inside the tube.

2. The reference electrode of claim 1, wherein the saturated reference salt comprises lithium chloride.

3. The reference electrode of claim 2, wherein the excess reference salt comprises calcium chloride.

4. The reference electrode of claim 1, wherein the saturated reference salt comprises calcium chloride.

5. The reference electrode of claim 4, wherein the excess reference salt comprises lithium chloride.

6. The reference electrode of claim 1, wherein the saturated reference salt comprises potassium chloride.

7. The reference electrode of claim 6, wherein the excess reference salt comprises lithium chloride.

8. The reference electrode of claim 6, wherein the excess reference salt comprises sodium chloride.

9. The reference electrode of claim 1, wherein the excess reference salt comprises cobalt(II) chloride.

10. The reference electrode of claim 1, wherein the nickel(II) chloride is anhydrous nickel(II) chloride.

11. A system comprising:

a crucible comprising:

a molten salt;

a working electrode placed within the molten salt;

a counter electrode placed within the molten salt;

a reference electrode placed within the molten salt comprising:

a tube;

a saturated reference salt placed inside the tube:

an excess reference salt in amounts beyond the saturation point is placed inside the tube comprising:

nickel II chloride; and a wire placed inside the tube.

12. The system of claim 11, wherein the saturated reference salt comprises lithium chloride.

13. The system of claim 11, wherein the saturated reference salt comprises calcium chloride.

14. The system of claim 11, wherein the excess reference salt comprises potassium chloride.

15. The system of claim 11, wherein the excess reference salt comprises sodium chloride.

16. The system of claim 11, wherein the excess reference salt comprises cobalt(II) chloride.

17. The system of claim 11, wherein the nickel(II) chloride is anhydrous nickel(II) chloride.

* * * * *